US009413431B2

(12) United States Patent
Chang et al.

(10) Patent No.: US 9,413,431 B2
(45) Date of Patent: Aug. 9, 2016

(54) TRANSCEIVER

(71) Applicant: FAVEPC Inc., Zhubei, Hsinchu (TW)

(72) Inventors: Keng-Hao Chang, Zhubei (TW); Shao-Chang Chang, Zhubei (TW)

(73) Assignee: FAVEPC INC., Zhubei, Hsinchu County (TW)

(*) Notice: Subject to any disclaimer, the term of this patent is extended or adjusted under 35 U.S.C. 154(b) by 0 days.

(21) Appl. No.: 14/470,476

(22) Filed: Aug. 27, 2014

(65) Prior Publication Data

US 2015/0063430 A1  Mar. 5, 2015

Related U.S. Application Data

(60) Provisional application No. 61/872,899, filed on Sep. 3, 2013.

(51) Int. Cl.
*H04B 1/38* (2015.01)
*H04L 5/16* (2006.01)
*H04B 5/00* (2006.01)

(52) U.S. Cl.
CPC ............ *H04B 5/0062* (2013.01); *H04B 5/0031* (2013.01)

(58) Field of Classification Search
CPC ............................ H04B 5/0031; H04B 5/0062
USPC ......................................... 375/219, 295, 316
See application file for complete search history.

(56) References Cited

U.S. PATENT DOCUMENTS

| | | | |
|---|---|---|---|
| 6,603,391 B1 * | 8/2003 | Greeff et al. ................. 340/10.3 |
| 6,831,562 B2 * | 12/2004 | Rodgers et al. ............. 340/572.4 |
| 7,511,604 B2 * | 3/2009 | Raphaeli et al. ............. 340/10.2 |
| 2007/0194932 A1 * | 8/2007 | Oishi ..................... H04B 1/525 340/572.7 |
| 2008/0268898 A1 * | 10/2008 | Willgert ................ G01S 13/758 455/556.1 |
| 2010/0052652 A1 * | 3/2010 | Mitchell ................ H04B 17/21 324/76.19 |
| 2010/0073137 A1 * | 3/2010 | Kobayashi ................... 340/10.1 |
| 2010/0102897 A1 * | 4/2010 | Moritsuka ............... H01P 5/227 333/109 |
| 2010/0176927 A1 * | 7/2010 | Partanen et al. ............. 340/10.3 |
| 2014/0341318 A1 * | 11/2014 | Pourkhaatoun et al. ...... 375/297 |

* cited by examiner

*Primary Examiner* — Freshteh N Aghdam
(74) *Attorney, Agent, or Firm* — Muncy, Geissler, Olds & Lowe, P.C.

(57) ABSTRACT

The present invention provides a transceiver for a radio frequency identification (RFID) reader. The transceiver includes an RF front end, a transmitting component, a receiving component, a power divider and a micro control unit (MCU). The power divider has three terminals. The first terminal of the power divider is connected to the transmitting component. The second terminal of the power divider is connected to the receiving component. The third terminal is connected to the RF front end. Moreover, the MCU is connected to the transmitting component and the receiving component, and generates a transmitted signal and receives a retrieved data. According to the present invention, the transceiver further includes an RF switch, a matching circuit and a receiving circuit.

9 Claims, 5 Drawing Sheets

TRANSCEIVER

CROSS-REFERENCE TO RELATED APPLICATION

This application claims the priority of U.S. patent application No. 61/872,899, filed on Sep. 3, 2013, which is incorporated herewith by reference.

BACKGROUND OF THE INVENTION

1. Field of the Invention

The present invention generally relates to a transceiver, and more specifically to a transceiver for a radio frequency identification (RFID) reader.

2. The Prior Arts

Nowadays, RFID has been widely used in various fields. In a traditional RFID reader of an RFID system, the analog front end (AFE) has a complex structure with a large circuit size, large power consumption and high cost. FIG. 1 is a block diagram illustrating a transceiver 11 of a traditional RFID reader 1. Referring to FIG. 1, the AFE 12 of the transceiver 11 of the traditional RFID reader 1 includes a pair of mixers 13 (i.e., an I-channel mixer 131 and a Q-channel mixer 132), a pair of dense reader mode (DRM) filters 14, a pair of inputting gain circuits 15, a pair of digitizers 16, a received signal strength indication (RSSI) measuring means 17 and an outputting gain circuit 18.

An RF signal RFS from an external device (such as an RFID tag) which is received by the RFID reader 1 is sent to a directional unit 19 and then sent to the pair of mixers 13. The received RF signal RFS is down-converted to an I-channel baseband signal IBS and a Q-channel baseband signal QBS by the pair of mixers 13, and the pair of DRM filters 14 eliminates undesired noise and harmonic components. Furthermore, the pair of inputting gain circuits 15 amplify the I-channel baseband signal IBS and the Q-channel baseband signal QBS. Subsequently, the amplified I-channel and Q-channel baseband signals are converted to digital signals IDS and QDS by the pair of digitizers 16. The digital signals IDS and QDS are sent to an MCU for post processing. On the other hand, the amplified I-channel and Q-channel baseband signals are also sent to the RSSI measuring means so as to measure RSSI and thereby detect interference from other external devices.

However, the pair of mixers 13, DRM filters 14 and inputting gain circuits 15 consume relatively large power, have large circuit size and high cost, which in turn results in a large overall size and high cost of the transceiver 11 of the RFID reader 1. Further, in order to accommodate large power consumption, the RFID reader 1 may require an external power supply, such as a battery. Accordingly, such an RFID reader 1 is not suitable for a portable device.

It may therefore be desirable to have a transceiver for an RFID reader which has a simple structure, small size and low power consumption, which is suitable for a portable device.

SUMMARY OF THE INVENTION

In light of the foregoing drawbacks, an objective of the present invention is to provide a small-size low-power transceiver that is suitable for a portable device.

For achieving the foregoing objective, the present invention provides a transceiver for a radio frequency identification (RFID) reader. The transceiver of the present invention may include an RF front end, having an antenna and an RF filter connected to the antenna; a transmitting component, having a first matching circuit and a transmitting circuit connected to the first matching circuit; a receiving component, having a second matching circuit, a detecting circuit, an amplifier and an analog-to-digital (A/D) converter; a power divider, having a first terminal connected to the first matching circuit of the transmitting component, a second terminal connected to the second matching circuit of the receiving component and a third terminal connected to the RF filter of the RF front end; and a micro control unit (MCU), connected to the transmitting component and the receiving component, generating a transmitted signal and receiving a retrieved data. Moreover, the detecting circuit of the present invention may be connected between the second matching circuit and an input terminal of the amplifier, and the A/D converter of the present invention may be connected to an output terminal of the amplifier.

According to the present invention, the transceiver may further include an RF switch, a third matching circuit and a receiving circuit. The RF switch may have three terminals that are connected to the RF filter of the RF front end, the third matching circuit and the third terminal of the power divider, respectively. The receiving circuit and the transmitting component may be integrated and may perform long-distance duplex transmission.

Preferably, the third matching circuit of the present invention may provide impedance matching between the terminal of the RF switch and an input terminal of the receiving circuit.

Moreover, the first matching circuit of the present invention may provide impedance matching between the first terminal of the power divider and an output terminal of the transmitting circuit, and the second matching circuit of the present invention may also provide impedance matching between the second terminal of the power divider and an input terminal of the detecting circuit.

Preferably, the detecting circuit of the present invention may include a diode, a capacitor and a first resistor connected to the capacitor in parallel. In addition, the anode of the diode is connected to the second matching circuit, and the cathode of the diode is connected to a terminal of the capacitor and a terminal of the first resistor.

Preferably, the diode of the present invention may be a Shockley diode. In addition, the capacitor and the first resistor may form a low-pass filter.

Preferably, the amplifier of the present invention may include an operational (OP) amplifier and a plurality of second resistors.

Preferably, the amplifier may amplify a baseband signal. Additionally, the plurality of second resistors may form a bandpass filter.

Preferably, the A/D converter may be a discrete component or an integrated component, and the A/D converter is integrated into the MCU if the A/D converter is an integrated component.

Preferably, the power divider may be a Wilkinson power divider.

BRIEF DESCRIPTION OF THE DRAWINGS

The present invention will be apparent to those skilled in the art by reading the following detailed description of preferred exemplary embodiments thereof, with reference to the attached drawings, in which.

DETAILED DESCRIPTION OF THE PREFERRED EMBODIMENT

Figure 1:
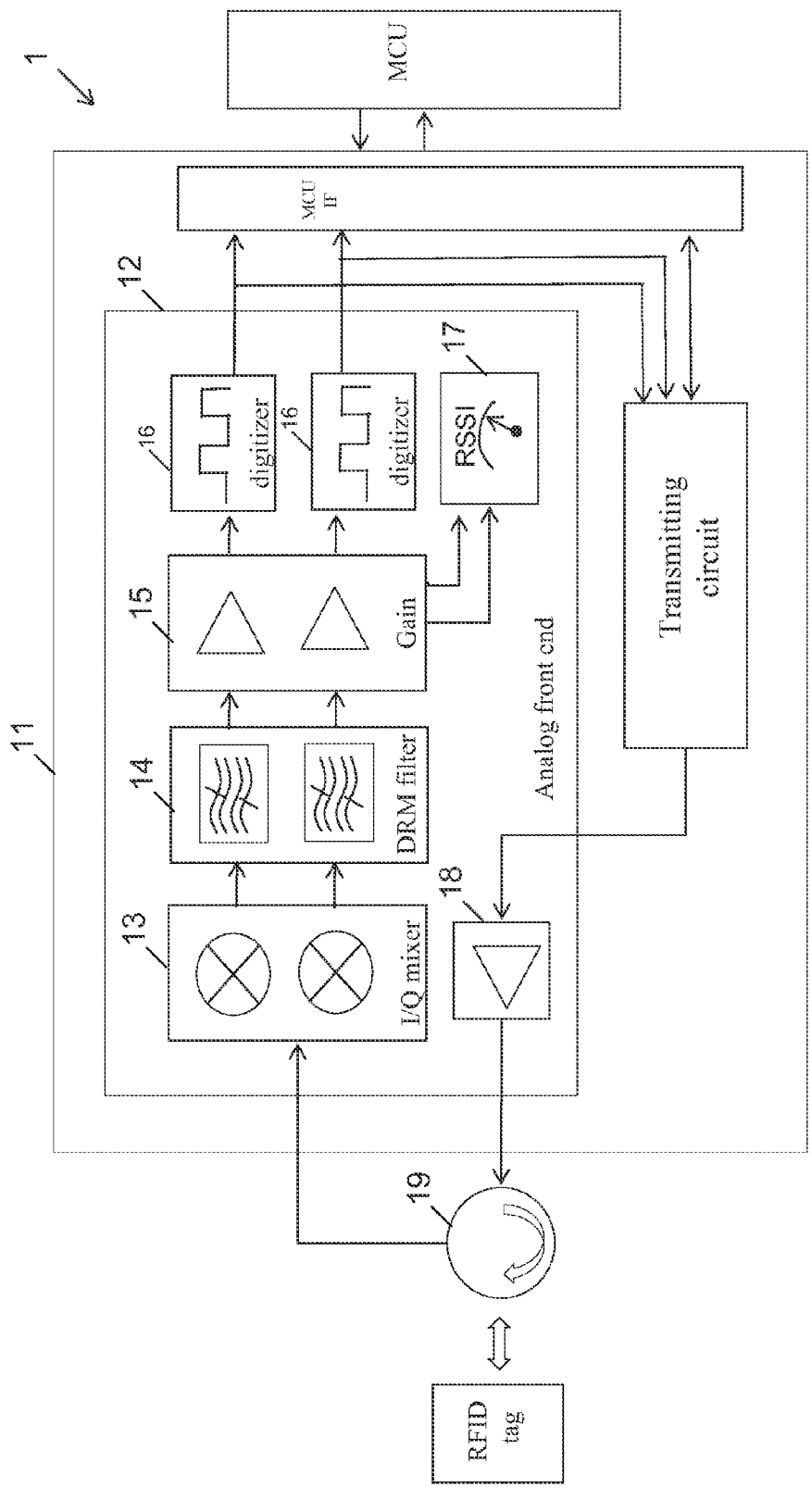
FIG. 1 is a block diagram illustrating a transceiver of a traditional RFID reader.

The accompanying drawings are included to provide a further understanding of the invention, and are incorporated in and constitute a part of this specification. The drawings illustrate exemplary embodiments of the invention and, together with the description, serve to explain the principles of the invention.

With regard to FIGS. 1-3B, the drawings showing exemplary embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

Figure 2A:
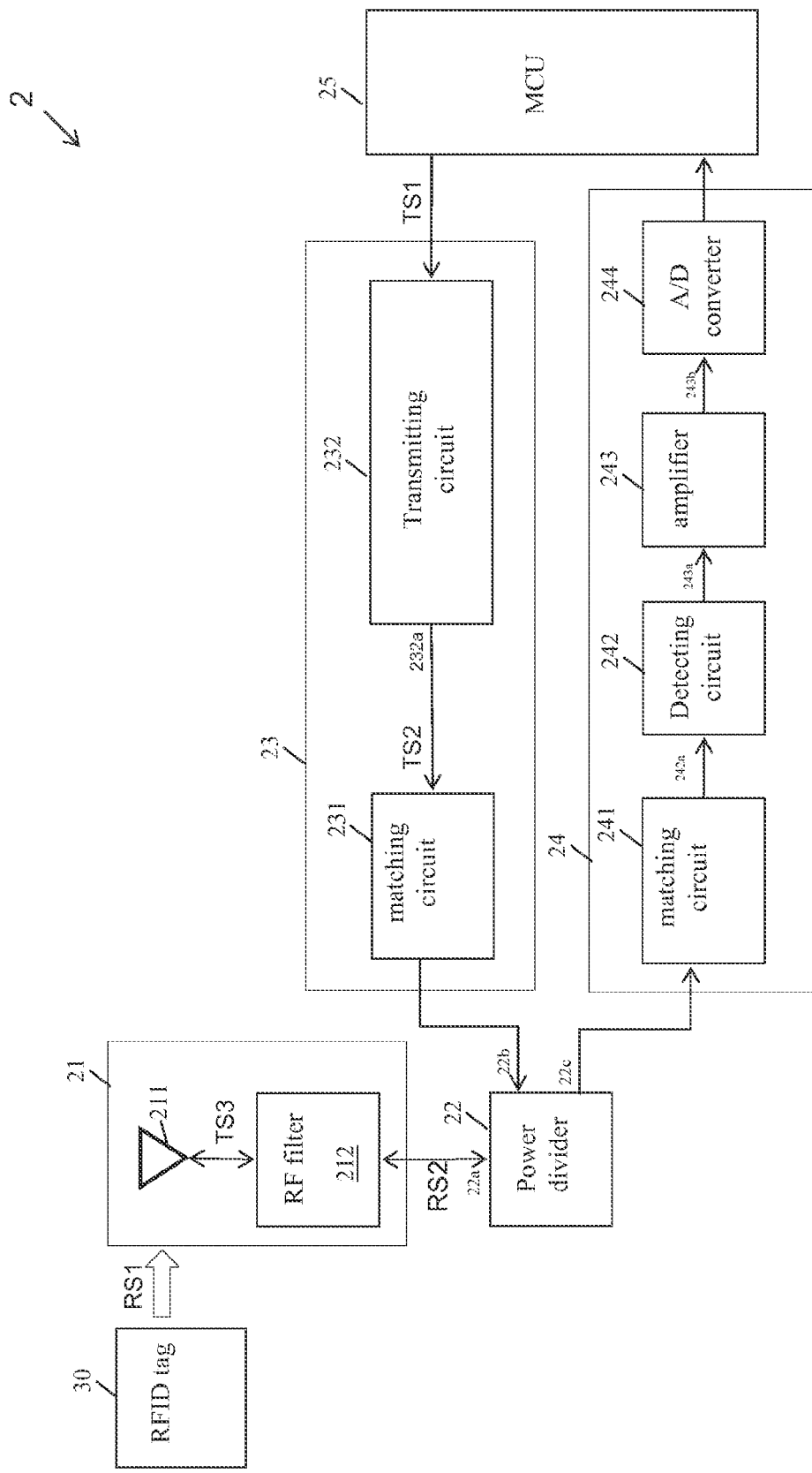
FIG. 2A is a block diagram illustrating an RFID reader in accordance with an exemplary embodiment of the present invention.

In light of the foregoing drawings, an objective of the present invention is to provide a transceiver. Referring to FIG. 2A, FIG. 2A is a block diagram illustrating an RFID reader 2 in accordance with an exemplary embodiment of the present invention. Referring to FIG. 2A, the RFID reader 2 may include an RF front end 21, a power divider 22, a transmitting component 23, a receiving component 24 and a micro control unit (MCU) 25.

The RF front end 21 may include an antenna 211 and an RF filter 212 connected to the antenna 211. The transmitting component 23 may include a matching circuit 231 and a transmitting circuit 232 connected to the matching circuit 231. The receiving component 24 may include a matching circuit 241, a detecting circuit 242, an amplifier 243 and an analog-to-digital (A/D) converter 244. In this exemplary embodiment of the present invention, the detecting circuit 242 is connected between the matching circuit 241 and an input terminal 243a of the amplifier 243. Furthermore, the A/D converter 244 is connected to the output terminal 243b of the amplifier 243.

The power divider 22 has a terminal 22a connected to the RF filter 212 and two terminals 22b and 22c connected to the matching circuit 231 of the transmitting component 23 and the matching circuit 241 of the receiving component 24 respectively.

The matching circuit 231 may provide impedance matching between the terminal 22b of the power divider 22 and the output terminal 232a of the transmitting circuit 232. Likewise, the matching circuit 241 may provide impedance matching between the terminal 22c of the power divider 22 and the input terminal 242a of the detecting circuit 242.

In a transmitting mode that the reader 2 may transmit a signal to an external device (not shown) disposed away from the reader 2 with a relatively long distance (for example, in the range of 5 m), the transmitted signal (TS1) may be generated by the MCU 25. The signal TS1 may then be modulated and up-converted to an RF signal TS2 by the transmitting circuit 232. The RF signal TS2 may then be sent to the antenna 211 through the matching circuit 231, the power divider 22 and the RF filter 212. In one exemplary embodiment of the present invention, the power divider 22 may be but is not limited to a Wilkinson Power divider. Furthermore, the RF filter 212 may eliminate undesired noise and harmonic components of the RF signal TS2. The antenna 211 may then transmit the filtered RF signal TS3 to the external device.

On the other hand, in a receiving mode that the reader 2 may receive signal from an external device 30 (such as an RFID tag) away from the reader 2 with a relatively short distance (such as in the range of 50 cm), an RF signal RS1 from the external device 30 may be received by the antenna 211 and then be sent to the detecting circuit 242 through the RF filter 212, the power divider 22 and the matching circuit 241. Similarly, the RF filter 212 may eliminate undesired noise and harmonic components of the RF signal RS1 (the filtered RF signal is termed as RS2).

The detecting circuit 242, the amplifier 243 and the A/D converter 244 operate as a whole may down-convert and demodulate the signal RS2, and data contained in the signal RS2 may thus be retrieved. The retrieved data may then be sent to the MCU 25. Furthermore, through the receiving component 24, signals from other devices (not shown) at the same frequency band (or channel) as the signal RS1 may be also received, and the RSSI may thus be measured.

Details of the structures and operations of the detecting circuit 242 and the amplifier 243 will be described in the exemplary embodiment of the present invention by reference to FIG. 2B.

Figure 2B:
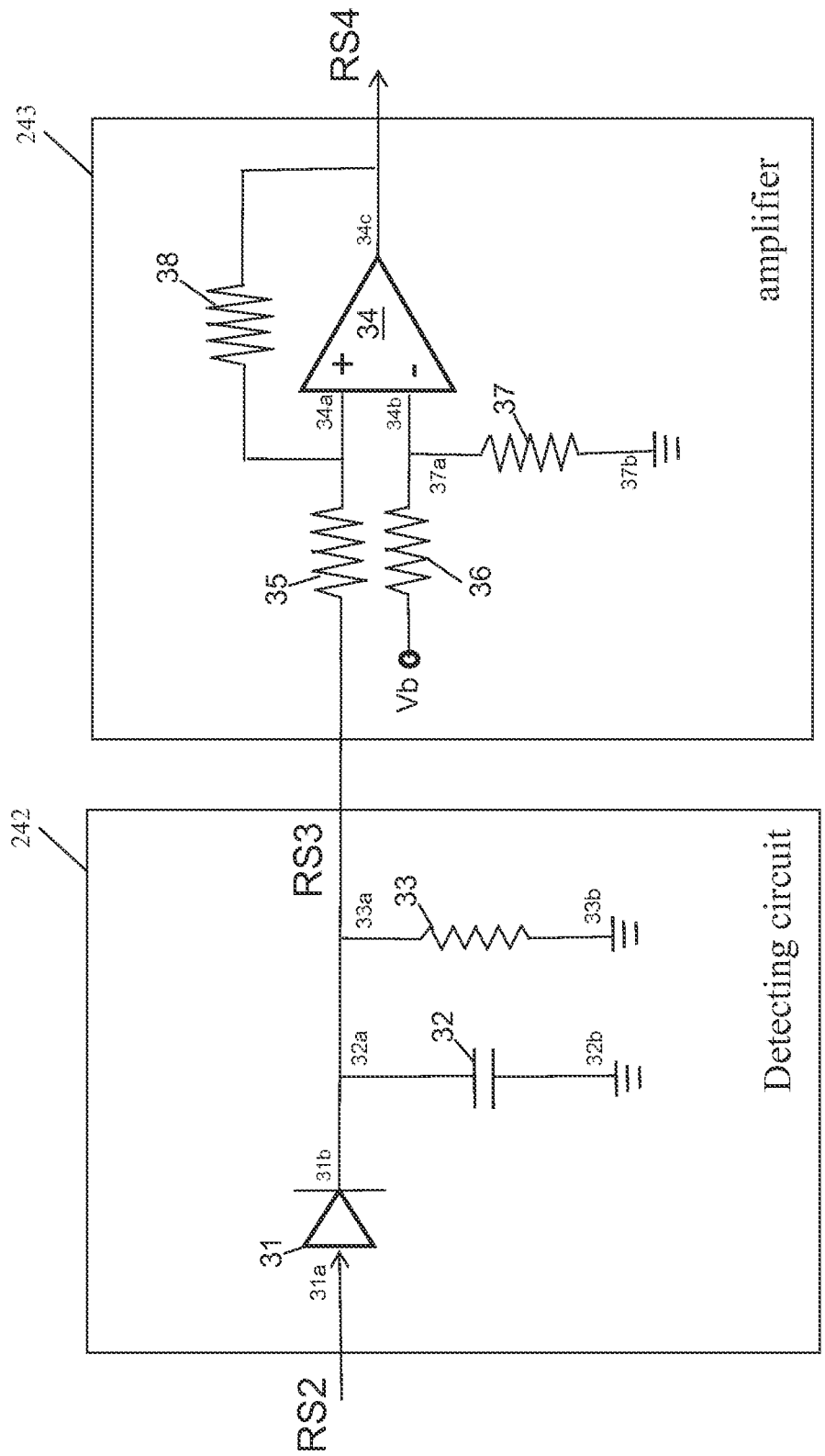
FIG. 2B is a block diagram illustrating the detecting circuit and the amplifier of FIG. 2A in accordance with an exemplary embodiment of the present invention.

FIG. 2B is a block diagram illustrating the detecting circuit 242 and the amplifier 243 of FIG. 2A in accordance with an exemplary embodiment of the present invention. Referring to FIG. 2B, the detecting circuit 242 may include a diode 31, a capacitor 32 and a resistor 33. In one exemplary embodiment of the present invention, the diode 31 may be but is not limited to a Shockley diode. The anode 31a of the diode 31 may be connected to the matching circuit 241, and the cathode 31b of the diode 31 may be connected to a terminal 32a of the capacitor 32 and a terminal 33a of the resistor 33. The capacitor 32 and the resistor 33 may be connected in parallel. Furthermore, a terminal 32b of the capacitor 32 and a terminal 33b of the resistor 33 may be grounded.

The diode 31 may rectify the signal RS2. Furthermore, the capacitor 32 and the resistor 33 operating as a whole may function as a low pass filter to eliminate carrier of the signal RS2. Thereby, the RS2 may be down-converted to a baseband signal RS3.

The amplifier 243 may include an operational amplifier (op-amp) 34 and four resistors 35, 36, 37 and 38. The non-inverting input terminal 34a of the op-amp 34 may be connected to the cathode 31b of the diode 31 through the resistor 35 and receive the baseband signal RS3 from the detecting circuit 242. Furthermore, through the resistor 36, the inverting input terminal 34b may be connected to a voltage source (not shown) supplying a bias voltage Vb. A terminal 37a of the resistor 37 may be connected to the inverting input terminal 34b of the op-amp 34, and a terminal 37b of the resistor 37 may be grounded. The resistor 38 may be connected between the non-inverting input terminal 34a and the output terminal 34c of the op-amp 34. The op-amp 34 may amplify the baseband signal RS3, and the four resistors 35, 36, 37 and 38 may function as a bandpass filter to eliminate undesired noise.

The amplified baseband signal RS4 may then be sent to the A/D converter 244, and the A/D converter 244 may convert the amplified baseband signal RS4 to digital signal. The digital signal represents the data contained in the signal RS2. In one exemplary embodiment of the present invention, the A/D converter 244 may be a discrete component. In another exemplary embodiment of the present invention, the A/D converter 244 may be integrated into the MCU 25.

Figure 3A:
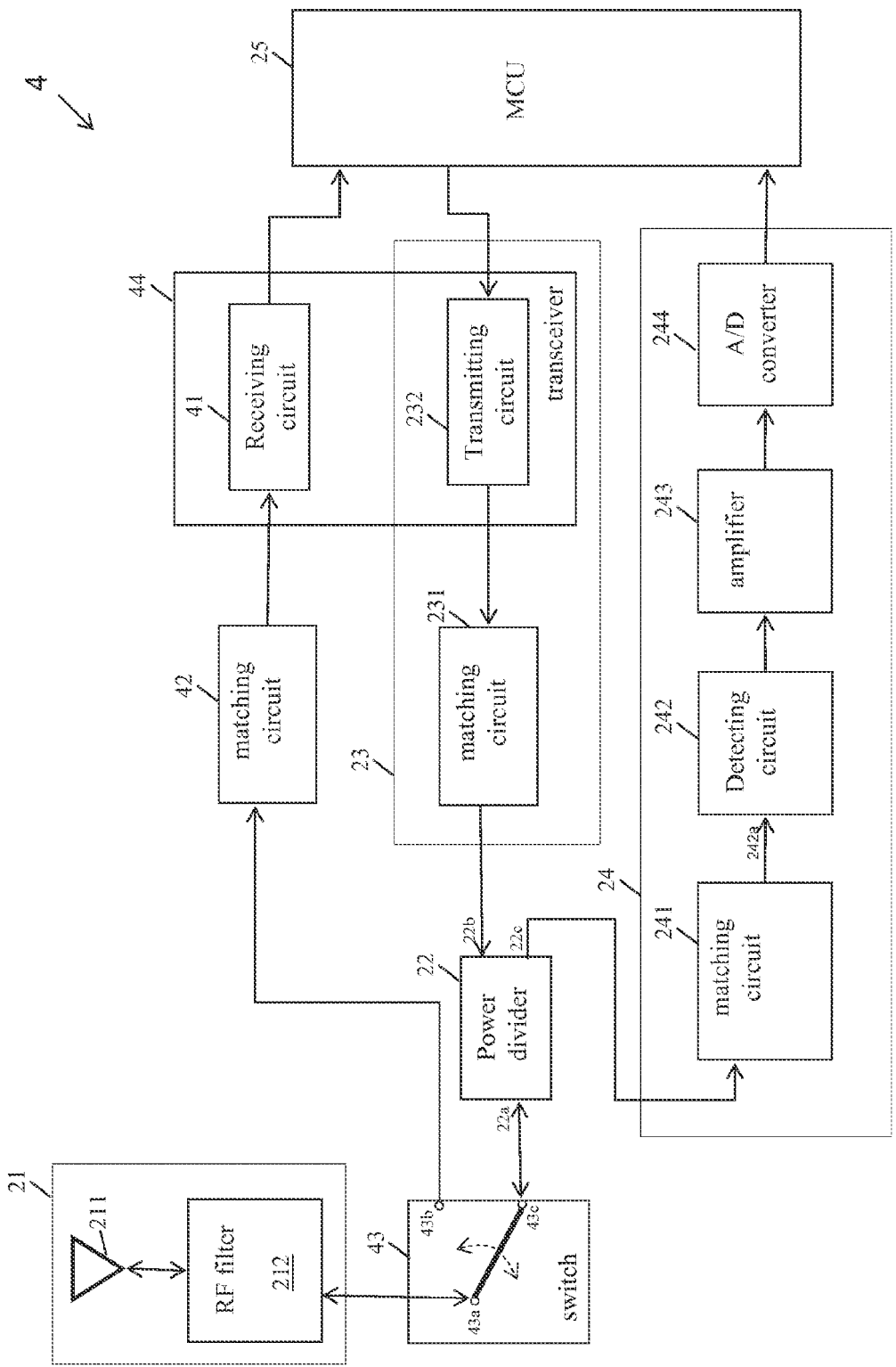
FIG. 3A is a block diagram illustrating an RFID reader in accordance with another exemplary embodiment of the present invention.

FIG. 3A is a block diagram illustrating a RFID reader 4 in accordance with another exemplary embodiment of the present invention. Referring to FIG. 3A, the reader 4 may be similar to the reader 2 illustrated in FIG. 2A except that, the reader 4 may further include a receiving circuit 41, a matching circuit 42 and a switch 43. In this exemplary embodiment of the present invention, the receiving circuit 41 and the transmitting circuit 232 are parts of a transceiver chip 44 which is capable of performing long-distance duplex transmission.

In one exemplary embodiment of the present invention, the switch 43 may be but is not limited to a single pole double throw (SPDT) RF switch. The SPDT RF switch 43 has three terminals 43a, 43b and 43c which are connected to the RF filter 212, the matching circuit 42 and the terminal 22a of the power divider 22 respectively.

Figure 3B:
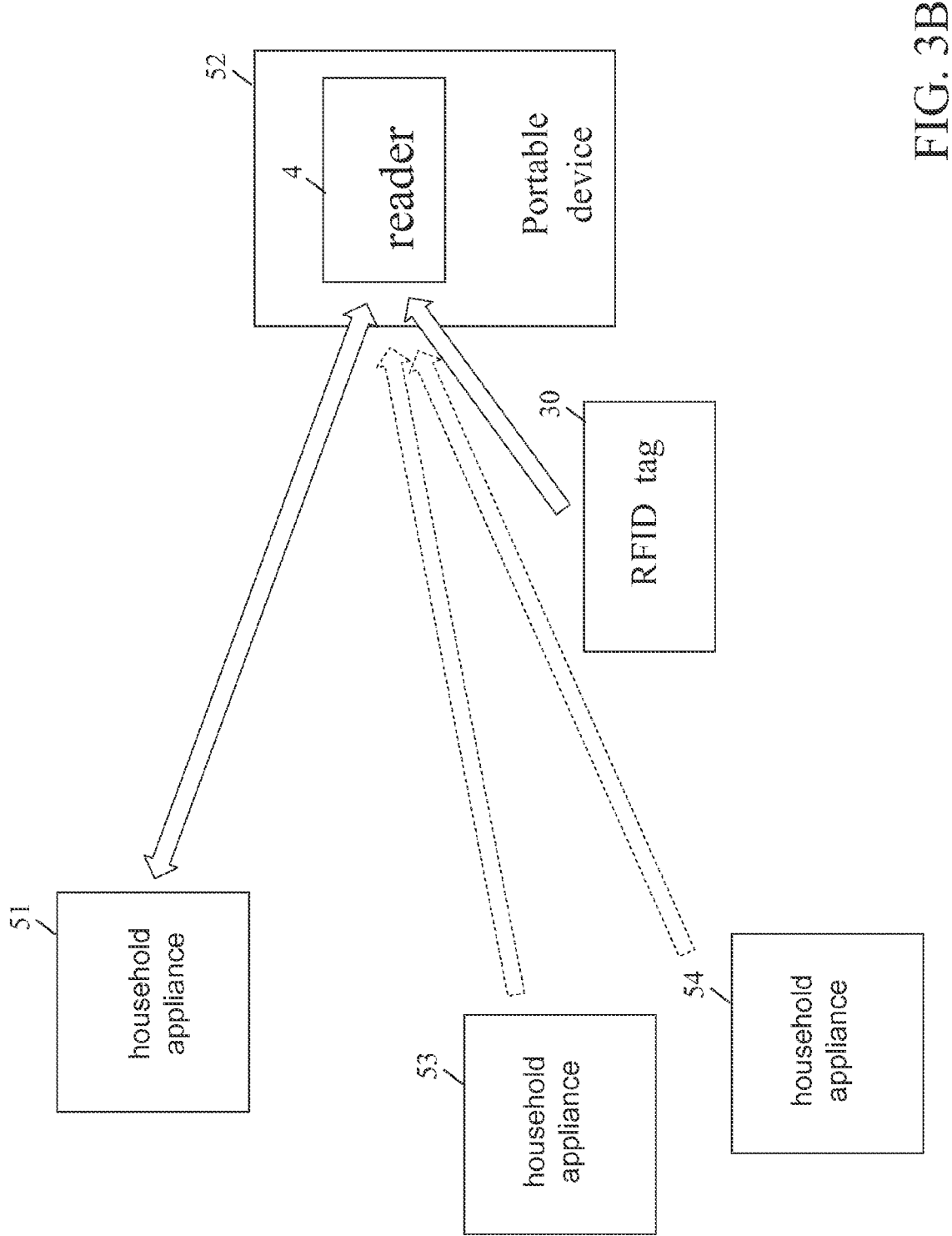
FIG. 3B is a block diagram illustrating the external devices and the RFID reader in accordance with an embodiment of the present invention.

In the transmitting mode, the SPDT RF switch 43 may be configured to connect the RF front end 21 to the terminal 22a of the power divider 22, which may in turn connect the RF front end 21 to the transmitting circuit 232. As described in the exemplary embodiment of the present invention by reference to FIG. 2A, with the help of the transmitting circuit 232, signal generated by the MCU 25 may be transmitted to an external device 51 which is located away from the reader 4 with a relatively long distance (as shown in FIG. 3B which illustrates the external device 51 and the RFID reader 4 in accordance with an exemplary embodiment of the present invention). Such an external device 51 may be but is not limited to a household appliance, for example, a television.

Referring back to FIG. 3A, on the other hand, in the receiving mode, the SPDT RF switch 43 may be configured to connect the RF front end 21 to the matching circuit 42, which may in turn connect the RF front end 21 to the receiving circuit 41. With the help of the receiving circuit 41, signal from the external device 51 may be received by the reader 4.

Referring to FIG. 3B, with the help of the transmitting circuit 232 and the receiving circuit 41, the household appliance 51 may transmit and receive control signals to and from the reader 4. Through the control signals, the household appliance 51 and a portable device 52 (such as a tablet computer or a smart phone) equipped with the reader 4 may be matched as a pair. In one exemplary embodiment of the present invention, the portable device 52 may function as a remote controller of the household appliance 51. Furthermore, before receiving control signal from the household appliance 51, the receiving circuit 41 of the reader 4 is capable of measuring RSSI so as to avoid interference from other household appliances 53 and 54.

In this exemplary embodiment of the present invention, with the help of the receiving component 24, the reader 4 may be still capable of receiving signal from the RFID tag 30.

The above exemplary embodiments describe the principle and effect of the present invention, but are not limited to the present invention. It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred exemplary embodiments thereof, it is apparent to those skilled in the art that a variety of modifications and changes may be made without departing from the scope of the present invention which is intended to be defined by the appended claims.

What is claimed is:

1. A transceiver for a radio frequency identification (RFD) reader, comprising:
   an RF front end, having an antenna and an RF filter connected to the antenna;
   a transmitter, having a first matching circuit and a transmitting circuit connected to the first matching circuit;
   a receiver, having a second matching circuit, a detecting circuit, an amplifier and an analog-to-digital (A/D) converter, wherein the detecting circuit is connected between the second matching circuit and an input terminal of the amplifier, and the A/D converter is connected to an output terminal of the amplifier;
   a power divider, having a first terminal connected to the first matching circuit of the transmitter, a second terminal connected to the second matching circuit of the receiver and a third terminal connected to the RF filter of the RF front end;
   a micro control unit (MCU), connected to the transmitter and the receiver, generating a transmitted signal and receiving a retrieved data,
   an RF switch,
   a third matching circuit, and
   a receiving circuit,
      wherein the RF switch has three terminals that are connected to the RF filter of the RF front end, the third matching circuit and the third terminal of the power divider, respectively, and the receiving circuit and the transmitter are integrated and perform long-distance duplex transmission.

2. The transceiver according to claim 1, wherein the third matching circuit provides impedance matching between the terminal of the RF switch and an input terminal of the receiving circuit.

3. The transceiver according to claim 1, wherein the detecting circuit comprises a diode, a capacitor and a first resistor connected to the capacitor in parallel, the anode of the diode is connected to the second matching circuit, and the cathode of the diode is connected to a terminal of the capacitor and a terminal of the first resistor.

4. The transceiver according to claim 3, wherein the diode is a Shockley diode, and the capacitor and the first resistor form a low-pass filter.

5. The transceiver according to claim 1, wherein the amplifier comprises an operational (OP) amplifier and a plurality of second resistors.

6. The transceiver according to claim 1, wherein the amplifier amplifies a baseband signal, and the plurality of second resistors forms a bandpass filter.

7. The transceiver according to claim 1, wherein the A/D converter is a discrete component or an integrated component, and the A/D converter is integrated into the MCU if the A/D converter is an integrated component.

8. The transceiver according to claim 1, wherein the power divider is a Wilkinson power divider.

9. The transceiver according to claim 1, wherein the first matching circuit provides impedance matching between the first terminal of the power divider and an output terminal of the transmitting circuit, and the second matching circuit provides impedance matching between the second terminal of the power divider and an input terminal of the detecting circuit.

\* \* \* \* \*